3,296,149
CORROSION-INHIBITING COMPOSITION OF MIXTURE OF MOLASSES, POTASSIUM IODIDE AND METAL SALT OF A FATTY ACID

Errol F. Cook, Marlborough, Mass., and Walter A. Szymanski, Grand Island, N.Y., assignors to Hooker Chemical Corporation, Niagara Falls, N.Y., a corporation of New York
No Drawing. Continuation of application Ser. No. 854,221, Nov. 20, 1959. This application Sept. 25, 1964, Ser. No. 399,393
6 Claims. (Cl. 252—389)

This application is a continuation of our prior application S.N. 854,221, filed November 20, 1959, now abandoned.

This invention relates to novel corrosion inhibiting compositions. This invention also relates to a method of inhibiting the corrosion effect of aqueous solutions of strong inorganic acidic compounds on mild steel.

The term "mild steel" as used throughout the description and claims is intended to include plain carbon steels designated by the Society of Automotive Engineers as the "1000" series, having an SAE number between about 1010 and 1095, but other steels having limited corrosion-resisting powers are also included.

Corrosion of mild steel by concentrated aqueous solutions of strong acidic compounds has long been a problem in the chemical industry. Because of these corrosive properties, it has been necessary to employ equipment constructed of expensive corrosion-resisting materials in processes where concentrated aqueous solutions of strong inorganic acidic compounds are employed.

Solid dicalcium phosphate has been used for many years by the animal feed industry as a source of phosphorus for animal feeds. Dicalcium phosphate can be admixed with other animal feed ingredients in mixers, pug mills, pelletizers and other processing equipment constructed of mild steel with little or no corrosive effect thereon. Concentrated phosphoric acid has more recently been employed as a source of phosphorus for animal feeds. When compared with dicalcium phosphate, phosphoric acid is easier to handle and is easier to mix with other animal feed ingredients. In addition, animal feeds containing phosphoric acid are generally more palatable to ruminants than animal feeds prepared from dicalcium phosphate. However, one serious disadvantage in the use of concentrated phosphoric acid as a component of animal feeds is that the acid is extremely corrosive to mild steel, the construction material normally employed in the animal feed industry. As a result, the many advantages in the use of phosphoric acid as a component of animal feeds are over-shadowed by the expense involved in coating the original mild steel equipment to prevent corrosion by the acid and/or the purchase of new equipment constructed of corrosion-resisting materials.

It is a primary object of this invention to provide novel corrosion inhibitors.

It is a further object of the invention to provide a method of inhibiting the corrosive effect of aqueous solutions of strong inorganic acidic compounds on mild steel.

Another object of the invention is to provide a novel corrosion inhibitor composition for strong inorganic acidic solutions.

Still another object of the invention is to provide a method of treating acidic phosphatic solutions to render them substantially non-corrosive when admixed with animal feed ingredients in equipment constructed of mild steel.

Another object of the invention is to provide an effective corrosion inhibiting composition for aqueous acidic phosphatic solutions that is not toxic to animals.

These and other objects of the invention will be apparent from the following detailed description.

It has now been discovered that aqueous solutions of strong inorganic acidic compounds can be rendered substantially non-corrosive to mild steel when a corrosion-inhibiting proportion of a mixture of molasses and potassium iodide is dispersed in the acid. If either molasses or potassium iodide is added to an acid such as phosphoric acid, and the treated acids are placed in agitated contact with mild steel, either of the treated acids is less corrosive than untreated phosphoric acid under the same conditions. However, it has been discovered that if both molasses and potassium iodide are admixed with concentrated phosphoric acid, preferably in the presence of a stabilizer, and the treated acid is placed in agitated contact with mild steel, there is a synergistic effect attained, and the acid thus treated is substantially non-corrosive to the mild steel.

More in detail, any aqueous solution of a strong inorganic acidic compound which corrodes mild steel when in agitated contact therewith, can be treated in accordance with the technique of the instant invention. Typical strong inorganic acidic compounds include orthophosphoric acid, metaphosphoric acid, pyrophosphoric acid, monocalcium phosphate, hypophosphorous acid, hydrochloric acid, sulfuric acid and mixtures thereof.

Any concentration of the acidic inorganic compound in the aqueous solution that has a corrosive effect upon mild steel can be treated in accordance with the technique of the instant invention. For example, orthophosphoric acid solutions having an $H_3PO_4$ concentration up to about one hundred percent, and preferably between about twenty and about ninety percent by weight can be effectively treated to inhibit corrosion. Sulfuric acid solutions having an $H_2SO_4$ concentration up to about eighty percent by weight, can also be effectively treated.

Blackstrap molasses is preferably employed as a component of the corrosion inhibiting mixture, but any molasses, such as corn molasses, beet molasses, citrus molasses, wood molasses, or mixtures thereof may be employed. Molasses is used in its usual commercial form, which contains between about fifteen and about fifty percent water by weight. Molasses is admixed with the aqueous solution of strong acidic inorganic compound in a proportion equivalent to between about three and about fifty, and preferably between about eight and about twenty parts of molasses (dry basis) per two thousand parts of acidic inorganic compound (dry basis) in the aqueous solution. If a weight ratio of molasses to acidic compound of less than about 3:2000 is employed, corrosion is not effectively inhibited. If a weight ratio of greater than about 50:2000 is employed, corrosion is effectively inhibited, but the acid solution may be unnecessarily adulterated with molasses.

Potassium iodide is admixed with the aqueous acidic solution in a proportion equivalent to between about 0.2 and about twenty, and preferably between about 0.2 and about 0.5 part of KI per two thousand parts of acidic inorganic compound in the aqueous solution. If a weight ratio of less than about 0.2 part per two thousand parts is employed, corrosion of the mild steel is not effectively inhibited. On the other hand, a weight ratio greater than about twenty parts KI per two thousand parts of acidic compound is employed, corrosion is effectively inhibited, but the acid solution may be unnecessarily adulterated with KI.

The weight ratio of molasses to potassium iodide is preferably between about 25:1 and about 100:1.

It is preferred to add a small but effective proportion of a stabilizer to the acidic solution in order to enhance the effectiveness of the potassium iodide component of the corrosion-inhibiting mixture. Fatty acid salts of metals in the alkali metal group, alkaline earth metal group and earth metal group of the periodic table can be employed as a stabilizer. Typical examples of suitable stabilizers include calcium stearate, calcium oleate, calcium palmitate, the corresponding aluminum salts, the corresponding sodium salts and mixtures thereof.

The stabilizer is preferably admixed with the acid solution in a proportion equivalent to a weight ratio of potassium iodide to stabilizer of between about 5:1 and about 15:1, but smaller or greater proportions may be employed if desired.

The aqueous solution of the strong inorganic acidic compound, molasses and potassium iodide, with or without a stabilizer, are admixed in the above described proportions in a suitable container provided with agitation means. It is preferred to add the ingredients simultaneously to the container, but the order of mixing the ingredients is not critical so long as a substantially homogeneous mixture is attained. If desired, molasses, potassium iodide, with or without a stabilizer are premixed in the above defined proportions prior to adding to the acidic solution.

Mixing of the ingredients is preferably carried out at room temperature, but higher or lower temperatures may be employed if desired.

Concentrated aqueous solutions of a strong inorganic acidic compound which have been treated in accordance with the novel technique of this invention may be stored and/or agitated in mild steel containers or other equipment without causing significant corrosion of the mild steel. The novel technique is particularly suitable for treating concentrated phosphoric acid used in the preparation of animal feeds and animal feed supplements, since the corrosion inhibiting ingredients are not toxic to animals. For example, concentrated phosphoric acid treated with the aforesaid corrosion inhibiting ingredients may be admixed with molasses, urea, and water to prepare a feed supplement for ruminants in accordance with the technique set forth in United States Patent No. 2,748,001, issued May 29, 1956, to Philip C. Anderson et al. However, acidic solutions treated in accordance with the instant novel technique may be employed for any purpose in which the small proportions of molasses and potassium iodide would not be detrimental.

The following examples are presented to illustrate the invention more fully without any intention of being limited thereby. All parts and percentages are by weight unless otherwise specified.

*Examples 1–4*

The effect of four concentrated aqueous phosphoric acid solutions, containing various additives, on the corrosion of mild steel was determined in accordane with the following procedure. The four acid solutions were designated as Examples 1, 2, 3 and 4 respectively. In each example, a four liter glass beaker provided with a motor driven paddle coated with a tetrafluoroethylene resin was employed. An SAE 1010 mild carbon steel probe, three inches by one-eighth of an inch, was secured in each beaker, positioned normal to the path of agitation, the radius from the center of rotation to the center of the probe being about three inches. The thickness of the probes are indicated below in the table. About four liters of phosphoric acid, containing about eighty percent $H_3PO_4$ by weight, produced by the "furnace" method was added to each beaker. The acid portions before and after adding reagents were agitated at the rate of about two hundred revolutions per minute. After five hours of exposure under these conditions, the following reagents were admixed with the phosphoric acid in the following proportions:

Example 1: one gallon black strap molasses per ton of eighty percent acid.

Example 2: four ounces potassium iodide per ton of eighty percent acid.

Example 3:
  One gallon black strap molasses per ton of eighty percent acid.
  Four ounces potassium iodide per ton of eighty percent acid.

Example 4:
  One gallon black strap molasses per ton of eighty percent acid.
  Four ounces C.P. potassium iodide per ton of eighty percent acid.
  0.4 ounce calcium stearate per ton of eighty percent acid.

After thirty-four hours of exposure, air was bubbled into each agitated solution at the rate of about 0.7 liter per minute. The air was turned off at the end of fifty-three hours in Example 3, and after about fifty-five hours in Examples 1, 2 and 4. Corrosion of the mild steel probes was determined periodically with a Labline Corrosion meter. The following table sets forth the results obtained in each test.

CORROSION PENETRATION, MICROINCHES

| Exposure Time, Hours | (20 mil probe) Example 1 Acid and Molasses | (10 mil probe) Example 2 Acid and KI | (10 mil probe) Example 3 Acid+Molasses+KI | (10 mil probe) Example 4 Acid+Molasses+KI and Ca Stearate |
|---|---|---|---|---|
| 0.5 | 10.0 | 9.0 | 5.0 | 5.0 |
| 5.0 | 376.0 | 385.0 | 282.0 | 338.0 |
| | Reagents added at end of fifth hour | | | |
| 6.0 | 404.0 | 415.0 | 300.0 | 347.0 |
| 34.0 | 654.0 | 565.0 | 460.0 | 370.0 |
| | Air added at end of 34th hour | | | |
| 35.0 | 666.0 | 590.0 | 460.0 | 370.0 |
| 53.0 | 882.0 | 842.0 | 478.0 | 397.0 |
| | | (Air off) | | |
| 54.0 | 836.0 | 898.0 | 478.0 | 403.0 |
| 55.0 | 860.0 | 927.0 | 478.0 | 403.0 |
| | (Air off) | | (Air off) | (Air off) |
| 119.0 | 1,184 | Off Scale | 478.0 | 406.0 |
| 127.0 | 1,270 | (>1,000) | 495.0 | 406.0 |

It can be seen from the above table that neither molasses alone (Example 1) nor potassium iodide alone (Example 2) effectively inhibited corrosion of the mild steel probes, while the novel inhibitors of Examples 3 and 4 markedly inhibit corrosion of the mild steel probes.

*Examples 5–6*

The procedure of Examples 2–4 was repeated with the following exceptions. The corrosion inhibiting compounds were added to the phosphoric acid at the start of the tests, and air was not bubbled through the solutions during the tests. The following inhibitors and proportions were employed.

Example 5:
  Four ounces potassium iodide per ton of eighty percent acid.
  0.4 ounce sodium oleate per ton of eighty percent acid.

Example 6:
  Four ounces potassium iodide per ton of eighty percent acid.
  0.4 ounce aluminum stearate per ton of eighty percent acid.

The following table sets forth the results obtained in each test.

CORROSION PENETRATION, MICROINCHES

| Exposure Time, Hours | Example 5 KI+Sodium Oleate | Example 6 KI+Aluminum Stearate |
|---|---|---|
| 1.5 | 4 | ---------- |
| 3.0 | ---------- | 4 |
| 18.0 | 20 | ---------- |
| 20.0 | ---------- | 32 |
| 22.0 | 20 | ---------- |
| 26.5 | 30 | ---------- |
| 27.0 | ---------- | 42 |
| 46.5 | 30 | ---------- |
| 57.0 | ---------- | 100 |
| 80.5 | ---------- | 224 |
| 91.5 | 280 | ---------- |
| 97.5 | 350 | ---------- |
| 117.5 | 1,090 | ---------- |
| 118.0 | ---------- | 1,200 |
| 138.0 | ---------- | 1,870 |
| 138.5 | 1,820 | ---------- |

It can be seen from these tests that sodium oleate and aluminum stearate effectively stabilize the corrosion inhibiting properties of KI for at least about fifty-seven hours.

*Example 7*

An aqueous fifty percent sulfuric acid solution was tested in accordance with the procedure of Examples 5 and 6, employing the following inhibitors and proportions:

One gallon black strap molasses per ton of fifty percent acid.
Four ounces potassium iodide per ton of fifty percent acid.
0.4 ounce calcium stearate per ton of fifty percent acid.

The following table sets forth the results obtained in this test.

| Exposure time, hours | Corrosion penetration, microinches |
|---|---|
| 2.5 | 50 |
| 21.25 | 110 |
| 77.5 | 110 |
| 119.0 | 112 |
| 126.0 | 149 |
| 145.0 | 186 |
| 217.0 | 186 |

It will be recognized by those skilled in the art that various modifications within the invention are possible, some of which have been referred to above. Therefore, we do not wish to be limited except as defined by the appended claims.

What is claimed is:
1. A corrosion-inhibiting composition for aqueous solutions of strong acidic inorganic compounds selected from the group consisting of phosphoric acid, mono-calcium phosphate, hypophosphorus acid, hydrochloric acid, sulfuric acid and mixtures thereof, which composition consists essentially of a mixture of molasses, potassium iodide and a metal salt of a fatty acid, the weight ratio of molasses to potassium iodide in said mixture being between about 25:1 and about 100:1, and the weight ratio of potassium iodide to said metal salt being between about 5:1 and about 15:1, said metal salt of a fatty acid being a salt of a metal selected from the group consisting of calcium, sodium, and aluminum, and a fatty acid selected from the group consisting of oleic, stearic, and palmitic acid.

2. The composition of claim 1 wherein said metal salt is calcium stearate.

3. A corrosion-resisting composition consisting essentially of an aqueous solution of a strong acidic inorganic compound selected from the group consisting of phosphoric acid, mono-calcium phosphate, hypophosphorus acid, hydrochloric acid, sulfuric acid and mixtures thereof, containing molasses in a proportion between about three and about fifty parts of molasses, dry basis, per two thousand parts of said acidic compound, potassium iodide in a proportion between about 0.2 and about twenty parts potassium iodide per two thousand parts of said acidic compound, and a metal salt of a fatty acid in the proportion of one part of said metal salt to between about five and about fifteen parts of said potassium iodide, said metal salt of a fatty acid being a salt of a metal selected from the group consisting of calcium, sodium and aluminum and a fatty acid selected from the group consisting of oleic, stearic, and palmitic acid.

4. The composition of claim 3 wherein said acidic compound is phosphoric acid.

5. The composition of claim 3 wherein said acidic compound is sulfuric acid.

6. The composition of claim 3 wherein said metal salt is calcium stearate.

References Cited by the Examiner

UNITED STATES PATENTS

| 1,809,041 | 6/1931 | Jenkins et al. | 252—136 |
| 1,935,911 | 11/1933 | Neilson | 252—136 |
| 1,948,029 | 2/1934 | Fisher | 252—396 |
| 2,382,193 | 8/1945 | Whitmoyer et al. | 99—2 |
| 2,708,184 | 5/1955 | Hager et al. | 252—147 |
| 3,062,612 | 11/1962 | Boucher | 252—146 |

FOREIGN PATENTS 569,138  5/1945  Great Britain.

SAMUEL H. BLECH, *Primary Examiner.*
JULIUS GREENWALD, ALBERT T. MEYERS,
*Examiners.*

UNITED STATES PATENT OFFICE
CERTIFICATE OF CORRECTION

Patent No. 3,296,149                                                     January 3, 1967

Errol F. Cook et al.

It is hereby certified that error appears in the above numbered patent requiring correction and that the said Letters Patent should read as corrected below.

Column 3, line 71, for "accordane" read -- accordance --; columns 3 and 4, in the table, second column, line 6 thereof, for "882.0" read -- 822.0 --.

Signed and sealed this 28th day of November 1967.

(SEAL)
Attest:

Edward M. Fletcher, Jr.

Attesting Officer

EDWARD J. BRENNER

Commissioner of Patents